INVENTOR.
Joseph P. Ruth,
BY
ATTORNEY

March 3, 1959  J. P. RUTH  2,876,143
SUGAR DIFFUSING APPARATUS
Filed Feb. 27, 1956  2 Sheets-Sheet 2

INVENTOR.
Joseph P. Ruth
BY
ATTORNEY

United States Patent Office 2,876,143
Patented Mar. 3, 1959

2,876,143

SUGAR DIFFUSING APPARATUS

Joseph P. Ruth, Denver, Colo.

Application February 27, 1956, Serial No. 567,827

5 Claims. (Cl. 127—7)

As a development from and an improvement in certain respects over the organization disclosed in my pending application for United States patent filed January 16, 1956, Serial No. 559,479 now Patent No. 2,836,519, and operable in the general environment typified by the disclosures of my earlier application for patent of the United States filed August 1, 1952, Serial No. 302,151 now Patent No. 2,749,258, this invention relates to sugar diffusing apparatus of continuously-operable type and has as a principal object to provide means enhancive of the extraction and recovery of the sugar content from sugar-bearing material treated thereby.

A further object of the invention is to provide novel and improved means operable in sugar diffusing apparatus of continuous, counter-current type to stimulate and promote the extraction and recovery of sugar content from sugar-bearing material during an initial phase of treatment therein.

A further object of the invention is to provide novel and improved means operable in sugar diffusing apparatus of continuous, counter-current type to enhance the sugar content therein extracted and recovered from sugar-bearing material in proportion to the volume of solution utilized.

A further object of the invention is to provide novel and improved means operable in sugar diffusing apparatus of continuous, counter-current type to minimize the propagation and sugar-consuming activity of bacteria characteristic of sugar-enriched solutions.

A further object of the invention is to provide novel and improved means operable in sugar diffusing apparatus of continuous, counter-current type to stabilize and maintain a desirably efficient hydrogen ion concentration in the solution characteristic of apparatus operation.

A further object of the invention is to provide novel and improved means effective in operative association with sugar diffusing apparatus of continuous, counter-current type to effectively deoxygenate and deaerate the solution water utilized in operation of the apparatus.

A further object of the invention is to provide novel and improved means cooperable in sugar diffusing apparatus of continuous, counter-current type to enhance the quality and to expedite the recovery of sugar extracted from sugar-bearing material processed therethrough.

A further object of the invention is to provide novel and improved sugar diffusing apparatus of continuous, counter-current type that is economical of construction, operation, and maintenance, adaptable to practical development in an extensive range of particular sizes and capacities, susceptible of facile operative regulation and control, and positive and efficient in attainment of the ends for which designed.

With the foregoing and other objects in view, my invention consists in the construction, arrangement, and operative combination of elements as hereinafter set forth, pointed out in my claims, and illustrated by the accompanying drawings, in which—

Figures 1, 2, 3:
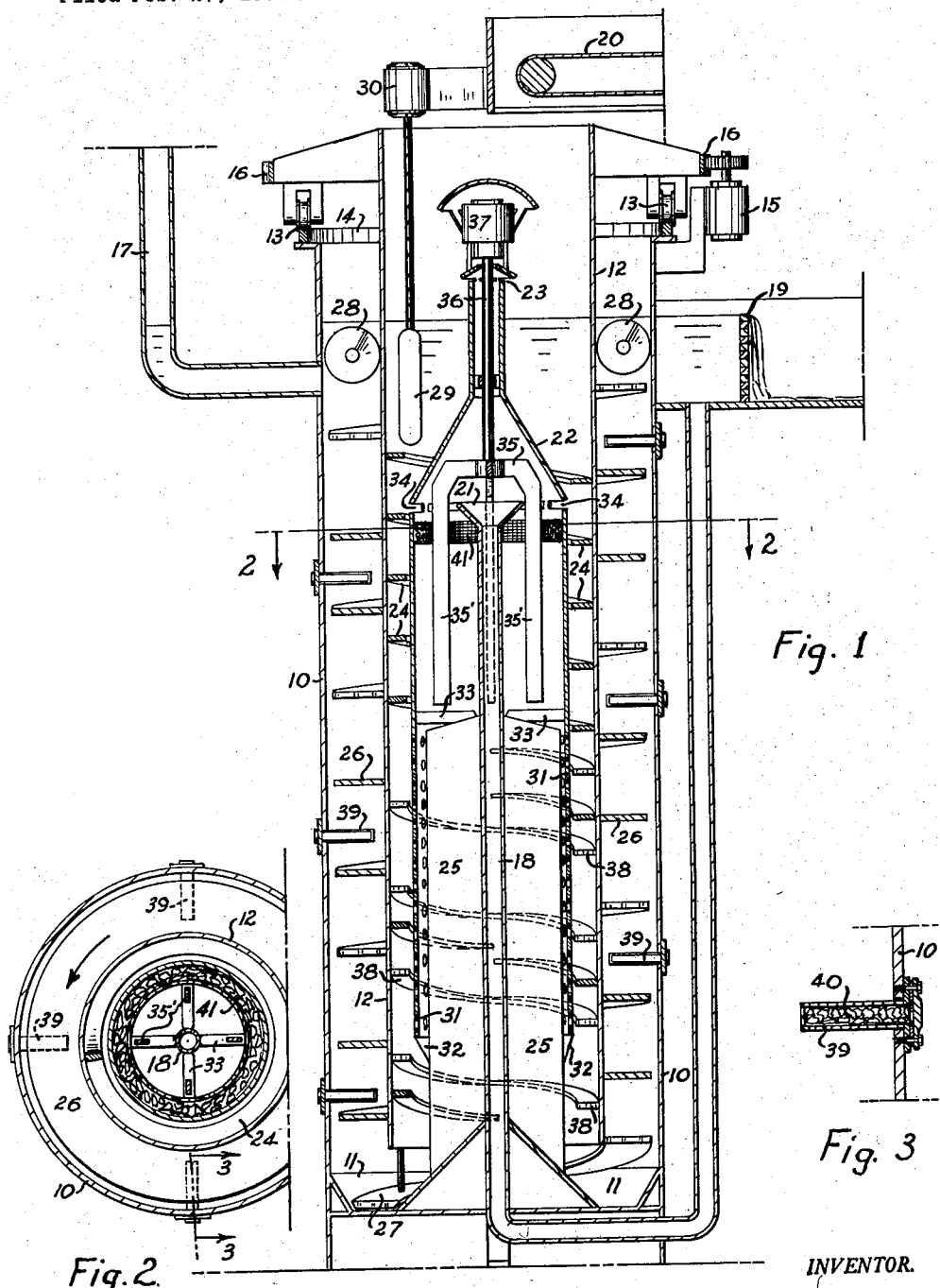
Figure 1 is a vertical section taken substantially axially through a typical sugar diffusing unit embodying the principles of the invention as arranged ready for practical use.
Figure 2 is a cross section taken substantially on the indicated line 2—2 of Figure 1, certain portions of the view being broken away to conserve space.
Figure 3 is a fragmentary, detail section, on a relatively enlarged scale, taken substantially on the indicated line 3—3 of Figure 2.

Typical of an environment wherein the improvements of the instant invention are advantageously applicable, sugar diffusing apparatus structurally and functionally analogous to that disclosed in my applications for patent above noted is illustrated in Figures 1 and 2 as a unitary organization of means cooperatively associated with an axially-upright, open-top, cylindrical tank 10 formed with a bottom closure characterized by an upwardly-opening, annular trough 11. A tubular well 12, open at both ends and of less diameter than the tank, is revolubly supported on the upper end of the tank 10, as by means of wheels 13 rotatable on axes fixed radially of the well in engagement with an annular track 14 fixed to the upper end of the tank, to dispose the well coaxially and interiorly of the tank in a spacing of the well lower end upwardly from the tank lower end trough 11 and a projection of the well upper end above the adjacent end of the tank, and power means, such as a motor 15 carried by the tank in driving engagement with a ring gear 16 fixed concentrically about the upper end of the well, are provided to effect uniform rotation of the well about its axis at desired speed. A charge and continuous circulation of water is maintained in and through the tank 10 and well 12 by means of an inflow line 17 leading from a suitable source or supply of water to delivery through the tank wall subjacent the upper end of the tank and hence exteriorly of the well, and an outflow line 18 fixed through the bottom of the tank and centrally of the well delivering to an adjustable-weir overflow 19 exteriorly adjacent the upper end of the tank determinative of a water charge level within the apparatus moderately below the open upper end of the tank. Material to be treated, such as sugar beet cossettes, is continuously infed in any expedient manner, as by means of a conveyor 20, to and for gravity-induced fall through the open upper end of the well 12, the upwardly-directed, preferably-flared intake end 21 of the outflow line 18 is disposed at a moderate spacing below the water charge level established by the overflow 19, and said intake end 21 is housed within a fixed hood 22 conformed and vented at its upper end to atmosphere through the water charge level, as at 23, in a spacing inwardly from the adjacent walls of the well 12 such as to provide for uprise of liquid through the open lower end of the hood in reaction to outflow through the line 18 at a rate less than that at which the material under treatment settles through the solution exteriorly of the hood. A spiral flight 24 fixed interiorly of and rotatable for depressing effect with the well 12 in clearing relation with and about the hood 22 functions to positively move the material under treatment downwardly through the space between the hood and the adjacent walls of the well and to inhibit congestion of material in such space, fixed vanes 25 longitudinally of the outflow line 18 within the lower portion of the well 12 outstand in angularly-spaced relation radially from said line to damp circulatory effects within the solution deriving from rotation of the well, and a spiral flight 26 fixed exteriorly about and rotatable for elevating effect with said well is provided with a tongue extension 27 of its lower end adapted to sweep through the trough 11 and operates to elevate material under treatment from the lower end of the well and through the space between the adjacent walls of the tank and well to the upper zone of the liquid charge and into engagement with suitable powered means, such as inclined, auger-type conveyors 28, effective to withdraw the material from the liquid charge for disposition exteriorly of the tank.

Thus provision is made for leaching a continuous feed of sugar-bearing material as the same travels through a continuous, countercurrent circulation of water subject to regulation as to level and rate of flow, for withdrawing enriched solution from the zone of the liquid charge adjacent the material infeed where the sugar content concentration is a maximum, for obviating congestion and compaction of the material within the apparatus, and for inhibiting entrainment of material under treatment with the withdrawn solution.

Supplementing the disclosures of my earlier applications as hereinbefore exemplified and promotive of enhanced sugar content concentration in the solution at the zone of solution withdrawal from the apparatus, with consequent expeditious, efficient, and more nearly complete extraction of the sugar content from the material with a given volume of water, the instant invention comprehends novel and improved arrangements for stimulating and maintaining an effective dispersion of the sugar-bearing material entering the liquid charge of the well 12 and for circulating and recirculating enriched solution through the incoming material feed for consequent increase of its sugar content concentration at the zone of its withdrawal from the apparatus. As is well understood, heavy pulps react to vibration and pulsation, as distinguished from agitation, with promotion of uniform solids dispersion and distribution throughout the associated liquid, elimination of solids compaction, and consequent maintenance of a pulp fluidity effective to entrain the solids, hence a feature of the present invention is the provision of a conventional pulsator or vibrator unit, designated by the numeral 29, immersed within the liquid charge of the well 12 immediately below the level established by the outflow 19 where it functions in reaction to drive from a motor 30 to vibrate or pulsate the portion of the liquid charge first receiving the infeed of material and to thereby separate and disperse the material elements for immediate and full exposure of all element surfaces to contact with the liquid, thus very much stimulating and expediting initiation of leaching action.

Mechanically promotive of circulation and recirculation of enriched solution to enhancement of its sugar content concentration, a foraminous or reticulate skirt extension 31 through which solution may freely pass to the exclusion of entrained material fixedly registers with and depends from the open lower end of the imperforate hood 22 to terminate in an open lower end upwardly adjacent the lower end of the well 12; said hood and its skirt extension 31 conveniently being supported and operatively positioned by brackets 32 and arms 33 affixed to the vanes 25. At about the level of the intake end 21 of the outflow line 18, the hood 22 is circumferentially opened as a succession of slots or holes 34 through which solution may pass to and from the hood interior and a spider 35 fixed to and rotatable with the lower end of a shaft 36 traversing the hood vent 23 in driven relation with a motor 37 supported by said vent is revolubly accommodated within the hood 22 immediately above the plane of the intake end 21. The spider 35 is constituted as a plurality of L-shaped arms affixed in angularly-spaced relation at the ends of their shorter legs to dispose their longer legs 35' for free rotation about the intake end 21 and in depending relation between said intake end and the imperforate lower portion of the hood 22. The spider 35 and its drive functions in the arrangment shown and described as an impeller operable within the hood 22 and about the intake end 21 to circulate solution from the interior of the hood outwardly through the hood openings 34 and into the path of material moving downwardly along the hood exterior for the generation of a recirculatory cycle of the enriched solution supplementary to and within the principal countercurrent circulation of the apparatus which is completed by flow of enriched solution through the skirt extension 31 to uprise within the hood 22 in common with the countercurrent circulation thereto. Thus the enriched solution is circulated and recirculated at the zone of its withdrawal from the apparatus repetitiously through and with efficient leaching effect upon the material and to the development of high sugar content concentration in the outflow from the diffuser, all without entrainment of solids in the solution outflow. Inhibitive of material congestion on the exterior surface of the skirt extension 31 and promotive of flow of enriched solution through and to the interior of the latter, a spiral flight, or flights, 38 fixed to and rotatable for depressing effect with the well 12 in close clearing relation about the skirt extension is arranged in an irregularity of convolution spacing effective to intermittently press the material engaged between adjacent convolutions for expression of solution thence and through the skirt extension and to alternately relieve the material from compression for unimpeded wash of solution therethrough.

It is well understood that the propagation and growth of bacteria characteristic of sugar diffusing operations hamper efficient recovery of sugar content, and that such bacteria thrive with obnoxious activity in solutions that are, or that become, slightly acidic, hence a further feature of the invention is directed to the automatic suppression of bacterial activity through means effective to neutralize any acidic characteristic of the solution within the apparatus hereinabove described. It is also well established that natural, high quality limerock is practically insoluble in neutral or alkaline water while reacting with neutralizing effect to water of acid characteristic, hence the presence of limerock in the circulatory path of the solution of sugar diffusing apparatus operates to suppress any acidity of the solution without increasing the alkalinity thereof and at very nominal expense, since the limerock is but slowly exhausted and only in reaction to solution acidity.

Typical of arrangements effective to apply limerock to the suppression of acidity and the consequent minimizing of bacterial activity in sugar diffusion apparatus of the type described, foraminous or reticulate cartridges 39 charged with broken limerock, as at 40, are inserted at appropriate points and in any desired number through, and interchangeably sealed to, the exterior wall of the tank 10 to intrude radially and inwardly of the tank in the path of solution flow between the adjacent tank and well walls, the spiral flight, or flights, 26 revoluble with the well through the space partially intersected by the cartridges 39 being interrupted to clear the latter as the well rotates. Manifestly, solution incoming from the line 17 and passing through the space between the adjacent tank and well walls washes over, through, and wets the surfaces of the limerock charges 40 carried by the cartridges 39 to maintain the limerock in condition to react with and suppress any acidic properties or characteristics of the solution.

Supplementing the action and extending the effect of the charged cartridges 39, a charge of broken limerock confined within a foraminous or reticulate pocket 41 interiorly and circumferentially of the hood 22 immediately subjacent the openings 34 thereof and in clearing relation with the depending legs 35' of the impeller functions to inhibit the development of acidity in the enriched solution circulated and recirculated adjacent the intake end of the outflow line 18.

Figures 4, 5:
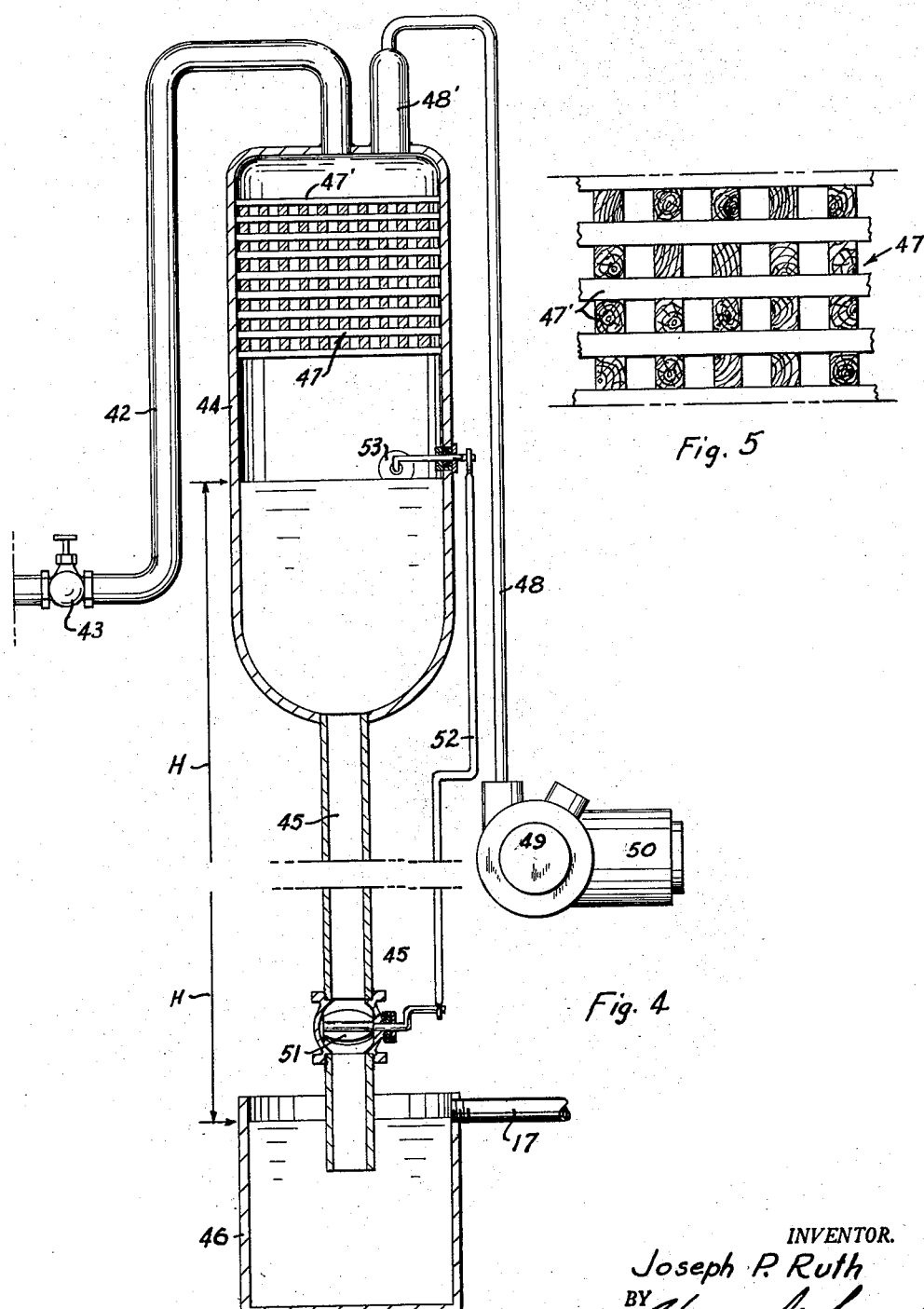
Figure 4 is a somewhat diagrammatic, vertical section axially through deoxygenating and deaerating means adapted for advantageous operative association with the unit shown in Figure 1, an intermediate portion of the view being broken away to conserve space.
Figure 5 is a fragmentary, detail view, on a relatively enlarged scale, of a diffusing grid comprised in the apparatus according to Figure 4.

Deaeration and deoxygenation of the water infed to the diffusing apparatus is of advantage in the suppression of bacterial propagation and activity therewithin, assists in the maintenance of a high quality in the enriched solution, and promotes efficient extraction of sugar content from the material at moderate temperatures with consequent savings in customary heating costs, and such conditioning of the feed water is convenient and expedient of attainment through association of the apparatus typified by Figure 4 with the water supply to the tank 10. As shown in Figure 4, the water supply line serving the infeed line 17 is designated by the numeral 42 and represented as leading from any suitable source or supply of water through a valve 43 to delivery within the upper end of a closed, vertically-elongated chamber 44 supported in any appropriate manner at a considerable elevation above the water level of the tank 10 established by the overflow 19. A flow conduit 45 extends, preferably vertically, from the lower end of the chamber 44 and in flow communication with the interior of the latter to terminate in an open lower end disposed within an open-top reservoir 46 of small capacity and below the intake end of the line 17 which is connected to and adjacent the upper end of said reservoir for gravity delivery of outflow from the latter to the tank 10. Thus, water incoming through the line 42 under flow regulation by the valve 43 is directed to and through the chamber 44 and conduit 45 to collect in the reservoir 46, whence it flows from a level above the lower end of the conduit 45 through the line 17 to the tank of the diffusing apparatus. The chamber 44 is organized to divide, disperse, and diffuse the water delivered thereto, whereby to release from the water stream the major proportion of the uncombined air, gases, and oxygen entrained therewith, for which purpose a diffusing grid 47 of appropriate type and construction, such as an assembly of like wooden bars 47' arranged in spacedly parallel, coplanar relation as layers of a stack wherein the bars of adjacent layers cross at approximately right angles, is mounted within and moderately spaced from the upper end of the chamber 44 in obstructing relation with the water stream incoming thereto through the line 42 and in such correlation with the length of the chamber as to terminate above the midlength of the latter, thus to define a rather small open space in the upper end of the chamber and a very much larger space communicating with the conduit 45 in the lower portion of the chamber. Effective through a line 48 communicating with the open space at the upper end of the chamber 44 by means of an enlargement 48', a vacuum pump 49 in driven relation with an electric motor 50 functions to exhaust vapors from the chamber and to maintain a subatmospheric pressure therewithin; the enlargement 48' intercoupling the chamber 44 and line 48 operating to minimize entrainment of water with the vapors withdrawn through said line. Vapors released as the water incoming to the chamber 44 through the line 42 is dispersed by and diffused through the grid 47 are steadily removed from the chamber by the pump 49 and the resulting largely deaerated and deoxygenated water fills the reservoir 46 to outflow through the line 17 and accumulates in the conduit 45 and lower portion of the chamber 44 as a tank feed supply rising above the outflow level of the reservoir 46 a distance represented by the line H determined by and proportioned to the pressure differential obtaining between the interior of the chamber 44 and the surface of the reservoir charge exposed to atmosphere and to a balance with the pressure differential such as to attain a level within the chamber well below the grid 47. Regulation of infeed to the chamber is had by means of the valve 43, and a flow-control valve 51 in the conduit 45 is linked, as at 52, to a float 53 within the chamber 44 in a manner to reflect altitudinal displacements of said float as adjustments of the valve 51 effective to maintain a substantially uniform liquid level within the chamber and a consequent liquid level in the reservoir 46 appropriate to establish outflow through the line 17 and to the tank 10.

As should be readily apparent, separation and dispersion of the elements of sugar-bearing material by means of the vibrator or pulsator 29, circulation and recirculation of solution in contact with said elements adjacent their input to the apparatus and the zone of solution outflow from the apparatus, the suppression of bacterial activity by means of solution acidity control and removal of oxygen, and the reduction of temperature requirements occasioned by deaeration and deoxygenation of the water utilized, all contribute to economy and efficiency of apparatus operation evidenced by high quality and enhanced sugar content concentration of the enriched solution outflow from the apparatus, reduction of the water volume required in proportion to the quantity of material treated, and economy in operating and maintenance costs.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. In sugar diffusing apparatus of continuous, countercurrent type having a tank adapted to confine a constant-level body of liquid, an open-end, tubular well rotatable about its vertically-disposed axis interiorly and in a spacing from the walls and floor of said tank within and in projection at its upper end above the liquid body confined by the tank, spiral flights exteriorly and interiorly of said well rotatable therewith in an opposite direction of inclination with depressing effect on material thereby engaged interiorly of the well and with elevating effect on material thereby engaged exteriorly of the well, a solution outflow line fixed coaxially of said well with its intake end in an upper zone of the liquid body confined by the tank, a hood fixedly shrouding the intake end of said line in an inward spacing from said well, a vent to atmosphere from said hood determinative of the rate of solution uprise therewithin, liquid supply means delivering to said tank exteriorly of said well, means for the input of discrete, sugar-bearing, vegetable material through the upper end of said well, vanes fixed radially of said outflow line within the lower portion of said well to minimize flow circulatory effects of well rotation, and means for the removal of input vegetable material from an upper zone of the liquid body exterior to the well, means promotive of sugar content extraction from the vegetable material entering the well, whereby to enhance the sugar content concentration of solution outflow through the line, said latter means comprising a powered pulsator submerged and reactive within an upper zone of the liquid within the well for maintained dispersion and diffusion of vegetable material elements infed thereto.

2. In sugar diffusing apparatus of continuous, countercurrent type having a tank adapted to confine a constant-level body of liquid, an open-end, tubular well rotatable about its vertically-disposed axis interiorly and in a spacing from the walls and floor of said tank within and in projection at its upper end above the liquid body confined by the tank, spiral flights exteriorly and interiorly of said well rotatable therewith in an opposite direction of inclination with depressing effect on material thereby engaged interiorly of the well and with elevating effect on material thereby engaged exteriorly of the well, a solution outflow line fixed coaxially of said well with its intake in an upper zone of the liquid body confined by the tank, a hood fixedly shrouding the intake end of said line in an inward spacing from said well, a vent to atmosphere from said hood determinative of the rate of solution uprise therewithin, vanes fixed radially of said outflow line within the lower portion of said well to minimize circulatory effects of well rotation, liquid supply means delivering to said tank exteriorly of said well, means for the input of discrete, sugar-bearing, vegetable material through the upper end of said well, and means for the removal of input vegetable material from an upper zone of the liquid body exterior to the well, means promotive of sugar content extraction from the vegetable material entering the well, whereby to enhance the sugar content concentration of solution outflow through said line, said latter means comprising passages through said hood accommodative of liquid circulation to the exclusion of entrained vegetable material and a powered impeller mounted on and coaxially within the hood operable in the space between said hood and the intake end of the outflow line to repetitiously circulate solution through the hood and the well zone exteriorly thereabout.

3. In sugar diffusing apparatus of continuous, countercurrent type having a tank adapted to confine a constant-level body of liquid, an open-end, tubular well rotatable about its vertically-disposed axis interiorly and in a spacing from the walls and floor of said tank within and in projection at its upper end above the liquid body confined by the tank, spiral flights exteriorly and interiorly of said well rotatable therewith in an opposite direction of inclination with depressing effect on material thereby engaged interiorly of the well and with elevating effect on material thereby engaged exteriorly of the well, a solution outflow line fixed coaxially of said well with its intake in an upper zone of the liquid body confined by the tank, a hood fixedly shrouding the intake end of said line in an inward spacing from said well, a vent to atmosphere from said hood determinative of the rate of solution uprise therewithin, vanes fixed radially of said outflow line within the lower portion of said well to minimize circulatory effects of well rotation, liquid supply means delivering to said tank exteriorly of said well, means for the input of discrete, sugar-bearing, vegetable material through the upper end of said well, and means for the removal of input vegetable material from an upper zone of the liquid body exterior to the well, means promotive of sugar content extraction from the vegetable material entering the well, whereby to enhance the sugar content concentration of solution outflow through said line, said latter means comprising a powered pulsator submerged and reactive within an upper zone of the liquid within the well for maintained dispersion and diffusion of vegetable material elements infed thereto, passages through said hood accommodative of liquid circulation to the exclusion of entrained vegetable material, and a powered impeller mounted on and coaxially within the hood operable in the space between said hood and the intake end of the outflow line to repetitiously circulate solution through the hood and the well zone exteriorly thereabout.

4. In sugar diffusing apparatus of continuous, countercurrent type having a tank adapted to confine a constant-level body of liquid, an open-end, tubular well rotatable about its vertically-disposed axis interiorly and in a spacing from the walls and floor of said tank within and in projection at its upper end above the liquid body confined by the tank, spiral flights exteriorly and interiorly of said well rotatable therewith in an opposite direction of inclination with depressing effect on material thereby engaged interiorly of the well and with elevating effect on material thereby engaged exteriorly of the well, a solution outflow line fixed coaxially of said well with its intake in an upper zone of the liquid body confined by the tank, a hood fixedly shrouding the intake end of said line in an inward spacing from said well, a vent to atmosphere from said hood determinative of the rate of solution uprise therewithin, vanes fixed radially of said outflow line within the lower portion of said well to minimize circulatory effects of well rotation, liquid supply means delivering to said tank exteriorly of said well, means for the input of discrete, sugar-bearing, vegetable material through the upper end of said well, and means for the removal of input vegetable material from an upper zone of the liquid body exterior to the well, means promotive of sugar content extraction from the vegetable material entering the well, whereby to enhance the sugar content concentration of solution outflow through said line, said latter means comprising a skirt extension of said hood terminating in an open end upwardly adjacent the lower end of the well, passages accommodative of liquid circulation to the exclusion of entrained vegetable matter through said skirt extension and peripherally of the hood at the zone of intake to said line, and a powered impeller mounted on and coaxially within the hood rotatable interiorly thereof above and about the intake end of said line for the repetitious circulation of solution through said passages and exteriorly and interiorly of the hood.

5. In sugar diffusing apparatus of continuous, countercurrent type having a tank adapted to confine a constant-level body of liquid, an open-end, tubular well rotatable about its vertically-disposed axis interiorly and in a spacing from the walls and floor of said tank within and in projection at its upper end above the liquid body confined by the tank, spiral flights exteriorly and interiorly of said well rotatable therewith in an opposite direction of inclination with depressing effect on material thereby engaged interiorly of the well and with elevating effect on material thereby engaged exteriorly of the well, a solution outflow line fixed coaxially of said well with its intake in an upper zone of the liquid body confined by the tank, a hood fixedly shrouding the intake end of said line in an inward spacing from said well, a vent to atmosphere from said hood determinative of the rate of solution uprise therewithin, vanes fixed radially of said outflow line within the lower portion of said well to minimize circulatory effects of well rotation, liquid supply means delivering to said tank exteriorly of said well, means for the input of discrete, sugar-bearing, vegetable material through the upper end of said well, and means for the removal of input vegetable material from an upper zone of the liquid body exterior to the well, means promotive of sugar content extraction from the vegetable material entering the well, whereby to enhance the sugar content concentration of solution outflow through said line, said latter means comprising a skirt extension of said hood terminating in an open end upwardly adjacent the lower end of the well, passages accommodative of liquid circulation to the exclusion of entrained vegetable material through said skirt extension and peripherally of the hood at the zone of intake to said line, a powered impeller mounted on and coaxially within the hood rotatable interiorly thereof above and about the intake end of said line for the repetitious circulation of solution through said passages and exteriorly and interiorly of the hood, and an irregularity of convolution spacing of the spiral flights on said well rotatable with material-depressing effect about said skirt extension operable to intermittently compress vegetable material thereby translated downwardly along the exterior surface of said extension.

References Cited in the file of this patent
UNITED STATES PATENTS

| 2,637,666 | Langen | May 5, 1953 |
| 2,749,258 | Ruth | June 5, 1956 |